United States Patent [19]

Cap et al.

[11] 4,337,424

[45] Jun. 29, 1982

[54] SPEED CONTROL FOR A ROTARY MACHINE

[75] Inventors: Heinrich Cap, St. Georgen; Johann von der Heide, Monchweiler; Rolf Müller, St. Georgen, all of Fed. Rep. of Germany

[73] Assignee: Papst-Motoren KG, St. Georgen, Fed. Rep. of Germany

[21] Appl. No.: 195,862

[22] Filed: Oct. 10, 1980

[30] Foreign Application Priority Data

Apr. 16, 1980 [CH] Switzerland .................. 2931/80

[51] Int. Cl.³ .............................................. H02P 5/16
[52] U.S. Cl. .................................... 318/328; 318/317; 318/345 B; 320/1
[58] Field of Search ................ 318/312, 317, 319, 326, 318/327, 328, 342, 345 R, 345 B, 494, 505; 320/1

[56] References Cited

U.S. PATENT DOCUMENTS

| | | | |
|---|---|---|---|
| 3,355,719 | 11/1967 | Fox | 320/1 |
| 3,946,295 | 3/1976 | Moore | 318/312 X |
| 4,121,141 | 10/1978 | Frazee | 318/326 |
| 4,240,014 | 12/1980 | Müller | 318/328 |

FOREIGN PATENT DOCUMENTS

| | | | |
|---|---|---|---|
| 1292909 | 4/1969 | Fed. Rep. of Germany | 318/326 |
| 7414595 | 12/1975 | France | 318/317 |

*Primary Examiner*—J. V. Truhe
*Assistant Examiner*—Richard M. Moose
*Attorney, Agent, or Firm*—Frishauf, Holtz, Goodman & Woodward

[57] ABSTRACT

A first capacitor is discharged with every pulse of a train of pulses of a frequency proportional to the actual speed of a rotary machine under control and is charged up during intervals between these pulses. The voltage of the first capacitor provides a signal to a threshold circuit which operates to provide a second signal whenever the voltage of the first capacitor exceeds a predetermined voltage which may be set in order to set the speed at which the machine is to be controlled. During the presence of the second signal a second capacitor is charged, beginning at a predetermined voltage, preferably zero. The regulating magnitude for the machine to be controlled is derived from the voltage of the second capacitor either directly or indirectly through a controller circuit and a power stage. The circuit is particularly useful for control of the speed of machines that run slowly or can conveniently provide only relatively few speed-indicating pulses per revolution.

10 Claims, 12 Drawing Figures

SPEED CONTROL FOR A ROTARY MACHINE

This invention concerns a speed control for a rotary machine, such as an electric motor, a turbine, or an internal combustion engine, in which e.g. a tachogenerator driven by the machine provides a signal of a frequency proportional to rotary speed, which is then processed so as to provide an output which can be used for speeding up or slowing down the machine whenever it slightly deviates from the desired speed.

From DE-PS No. 1 254 170, an electrical speed control system is known for controlling the speed of a turbine. A tachogenerator is coupled to the turbine. Its output frequency is multiplied and then modulates in a ring modulator an alternating voltage of a prescribed frequency. This modulated wave, after passage through a low-pass filter is differentiated to obtain a train of pulses which periodically activate a transistor that discharges a capacitor that continuously receives a substantially constant charging current from a current source. If the differentiated pulses follow each other closely, the charge voltage of the capacitor reaches only low values. When pulses follow each other at greater intervals, the charge voltage of the condenser reaches higher values. This charge voltage is sensed with a threshold switch, the output voltage of which controls the speed regulation process, for example, by controlling a valve that opens or closes the steam supply to the turbine.

In this known system, there is accordingly involved a two-point regulation system, which is unsatisfactory for many purposes that require speed regulation. Furthermore, particular precautions must be taken in order to prevent the machine on running up to speed from running right through the regulation range and consequently continuing to increase in speed out of control. For this purpose, the known system requires a special protection circuit.

THE INVENTION

It is an object of the present invention to provide a speed control that avoids the disadvantages of the known speed-control system and, particularly, a speed control capable of keeping the controlled machine running very precisely at the controlled speed, without involving risk or loss of control in start-up.

According to the invention, a capacitor that is discharged in every pulse of a pulse train of a frequency proportional to the speed and is charged between pulses furnishes the value of the charge voltage as a signal to a threshold circuit which is used to control the charge of a second capacitor, the charging of the second capacitor beginning, each time, from a predetermined value, when the voltage of the first capacitor rises past the predetermined value, the latter being preferably capable of being set so as to provide a speed setting.

The second capacitor charges either directly or indirectly through a controller or the like, determines the value of the regulating current or other magnitude used for varying the speed of the motor. To start the charging of the second capacitor each time from a predetermined value, the threshold circuit is caused to produce a signal equivalent to the onset of a normal output signal responding to the voltage of the first capacitor exceeding the predetermined voltage value, in order to provide a brief pulse for discharging the second capacitor.

Preferably a differentiating circuit is connected between the outputs of the threshold circuit and the normalizing circuit used for discharging the second capacitor, in order to discharge the latter either upon the appearance either of a normal output signal of the threshold circuit or of an equivalent signal provided for the purpose in the manner already mentioned.

There are several ways of providing the aforesaid equivalent signal. It may be derived from the same pulses that provide for discharging the first capacitor, either through a separate amplifier or an electronic switch, or through a separate differentiating circuit and it may be desirable to utilize a decoupling resistor where two inputs are provided to the same input of the threshold circuit, the latter being preferably in the form of a comparator such as may be constituted by means of an operational amplifier.

Because of the repeated normalization of the second capacitor before the start of each charging thereof, there is no danger of obtaining a false control allowing further increase of speed when the speed is already too high.

A speed control system according to the invention is particularly useful for control of the rotary speed of a motor from which only a relatively low pulse frequency proportional to motor speed is available, as in the case of a slowly-running motor for directly driving a turntable used for playing or recording sound records and, per rotor likewise, a fast-running motor which provides, for example, only one control pulse per rotor revolution.

BRIEF DESCRIPTION OF THE DRAWINGS

The invention is further described by way of illustrative examples with reference to the annexed drawings, in which.

DESCRIPTION OF THE ILLUSTRATED EMBODIMENTS

Figure 1:
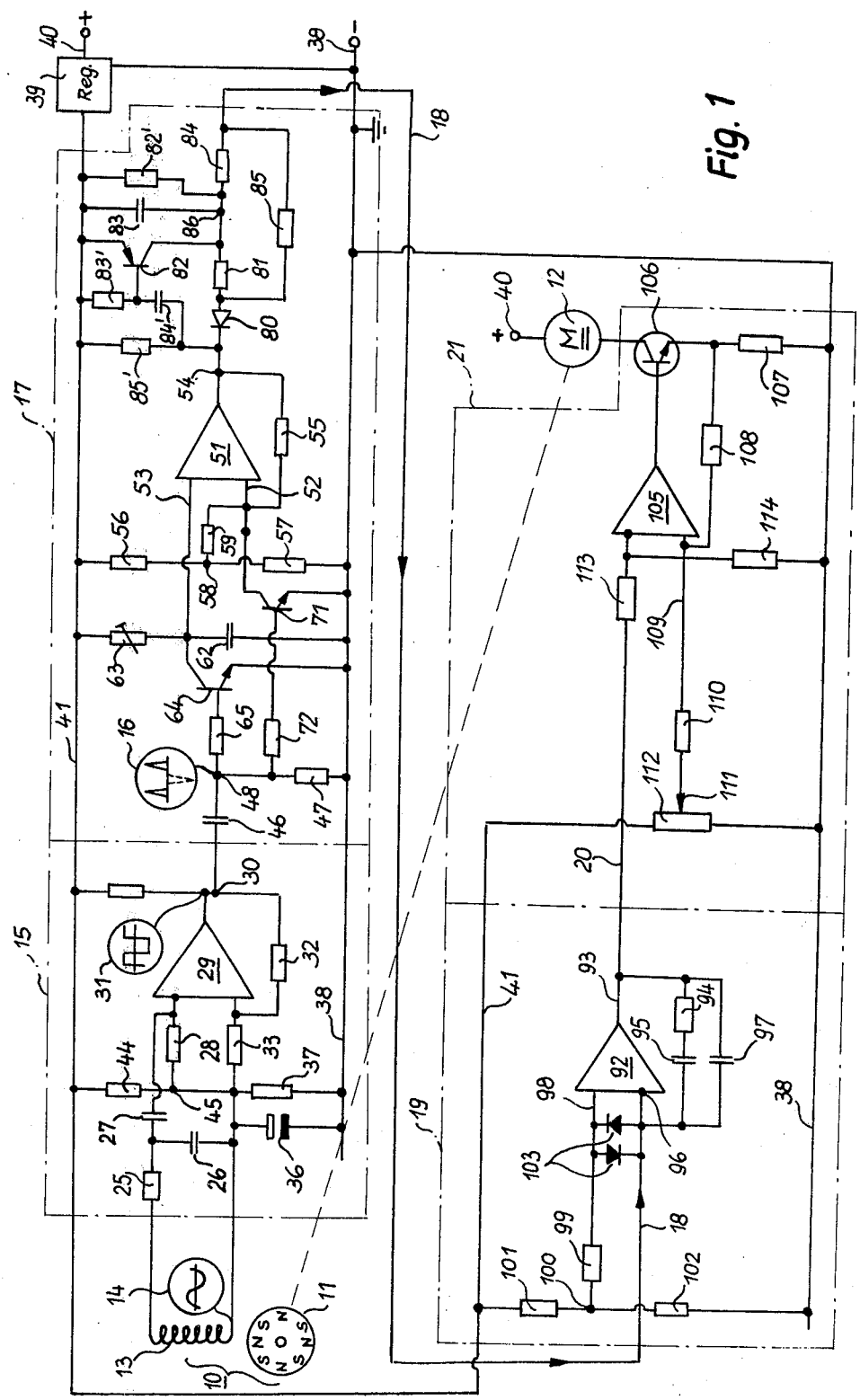
FIG. 1 is a circuit diagram of a preferred embodiment of a speed control circuit according to the invention.

FIG. 1 shows a first and preferred embodiment of the invention. As there shown, a tachogenerator 10 has a permanently magnetic rotor 11 which is driven by the motor 12 under speed control, and a stator winding 13 which produces a sinusoidal output voltage 14. The motor 12 is normally a brushless dc motor, but it is to be understood that the invention is also applicable to other rotary motors and engines, for example, for speed control of a turbine or of an internal combustion engine.

The signals 14 are supplied to a pulse-shaping stage 15 that includes a bandpass filter. The output of stage 15 produces, at the output of the coupling condensor 46 of the following stage, sharp needlelike pulses 16 of a frequency corresponding to that of the signals 14. These pulses are then supplied to a frequency-to-voltage convertor 17, at the output 18 of which an analog voltage is obtained that is a function of the speed of the motor 12. This voltage is then supplied to an amplifying controller 19 with a proportional-integral PI behavior or characteristic. At its output 20 the controller 19 provides control signals for a current amplifier 21, the output of which provides the current for the motor 12.

In this way the current in the motor 12 is so controlled that the motor speed is held constant within very narrow limits.

In the illustrated embodiment, the motor 12 runs at 200 rpm and the tachogenerator 10 accordingly provides a frequency of 200 Hz. For this reason, the stage 15 is so designed that it favors the transmission of frequencies between 100 and 1000 Hz. For starting up, very low frequencies must naturally also be allowed to pass. A resistor 25 (100 ohms) and a capacitor 26 (1.5 µf) operate as a low-pass filter, while a capacitor 27 (1 µf) and a resistor 28 (1.5 k ohms) operate as a high-pass filter. An operational amplifier 29 serves for pulse shaping. At its output 30, a rectangular voltage wave 31 is obtained. The output 30 is connected through a resistor 32 of high resistance with the non-inverting input of the operational amplifier 29, which input is also connected through a resistor 33 with an output of the tachogenerator 10, the other output of which is connected, through the series combination of resistor 25 and capacitor 27, with the inverting input of the operational amplifier.

The terminal of the tachogenerator connected to the resistor 33 is also connected through the parallel combination of a capacitor 36 (15 µf) and the resistor 37 (1 k ohms) with the negative voltage bus 38 that operates effectively as ground or reference potential. A positive voltage bus 41 is supplied by a regulated voltage of, for example, +5 volts by a voltage regulator 39 connected to a voltage source 40. A resistor 44 is connected between the positive bus 41 and a connection point or node which is connected through a resistor 28 with the inverting input of the operational amplifier 29 and via the resistor 33 with the noninverting input of the operational amplifier. The stage 15 thus converts the sinusoidal signal 14 into a rectangular signal 31 and preferentially amplifies the frequencies between 100 and 1000 Hz. The same stage 15 is also used in the embodiment of FIG. 3 and for that reason the presentation is not repeated there.

A differentiating network consisting of a capacitor 46 and a resistor 47 converts the rectangular signals of the output 30 of the stage 15 into the needlelike pulses 16 that appear at the connection point 48. Only the positive-going pulses are utilized.

The converter 17 contains an operational amplifier 51 that serves as the threshold circuit and is therefore connected as a comparator. Its noninverting input is designated 52, its inverting input 53, and its output 54. A resistor 55 of high resistance is connected between the output 54 and the noninverting input 52. A voltage divider consisting of two equal resistances 56 and 57 is connected between the positive and negative busses 41 and 38, and has its tap 58 connected through a resistor 59 with the noninverting input 52 of the operational amplifier.

A first capacitor 62 of, for example, 30 nF is connected between the inverting input 53 of the operational amplifier and the negative bus 38. An adjustable resistor 63 of, for example, 200 k ohms, determines the rate of charge of the capacitor 62 and serves to set the desired speed at which the motor is to be controlled. The first capacitor 62 is associated with a discharge circuit branch in the form of an npn transistor 64 that has its collector connected to the inverting input 53 of the operational amplifier and its emitter connected to the negative bus 38. Its base is connected through a resistor 65 with a circuit point 48, so that during each positive needle pulse 16 the transistor 64 is made briefly fully conductive and discharges the first capacitor 62 to a great extent, so that the potential at the inverting input 53 of the operational amplifier then corresponds approximately to the potential of the negative bus 38, and thereafter rises again while the capacitor again charges up through the charging resistor 63. This is shown in lines (A) and (B) of FIG. 2.

The positive needle pulses are there also designated 16. They produce in each case at 66 a discharge of the first capacitor 62. The charge voltage $u_C$ 62 is shown with reference to the line (B) of FIG. 2.

The threshold value voltage of the operational amplifier 51 is there designated $u_t$. So long as the voltage across the first capacitor 62 does not reach $u_t$, the operational amplifier 51 has a positive potential at its output, this potential being shown with reference to line (C) of FIG. 2, and designated 67. When the voltage across the first capacitor 62 oversteps the value $u_t$, the potential at the output 54 of the operational amplifier jumps to a lower value designated 68 with reference to line (C) of FIG. 2.

A setback transistor 71 is also controlled by the positive needle pulses 16. The collector of the transistor 71 is connected with the noninverting input 52 of the operational amplifier, its emitter with the negative bus 38, and its base through a resistor 72 with a circuit point 48. The setback transistor 71 is thus made conducting simultaneously with the discharge transistor 64 and connects the input 52 with the negative bus 38. In consequence, at the output 54 of the operational amplifier, there arises quite briefly the identical effect as in the case of a high charge of the first capacitor 62 (i.e., this output becomes more negative and takes the potential 68). Since in this operation the first capacitor 62 is still involved in discharge, it is made sure that the potential at the input 53 of the operational amplifier thereby sinks more slowly, while the fall of potential at the input 52 of the operational amplifier takes place suddenly. In other words, this setback operation takes effect in each case from the output 54 onwards. This is shown in FIG. 2.

There, the needle pulses 16 for a rapidly rising speed are illustrated. In line (B) the five first sawteeth do reach the voltage $u_t$, but the following ones no longer do so. So long as $u_t$ is reached, the effect of the setback transistor 71 at the output 54 is practically nil. The somewhat delayed rise at 75 shown on line (C) of FIG. 2, which is exaggerated in the drawing, is caused by the capacitor 84'. When $u_t$ is no longer reached, each pulse 16 causes the setback transistor 71 to become conducting, and a brief needle pulse 76 appears at the output 54. These needle pulses 76 prevent the speed of the motor from rising unconstrained when the reference value is exceded and, hence, have an important function.

Figure 2:
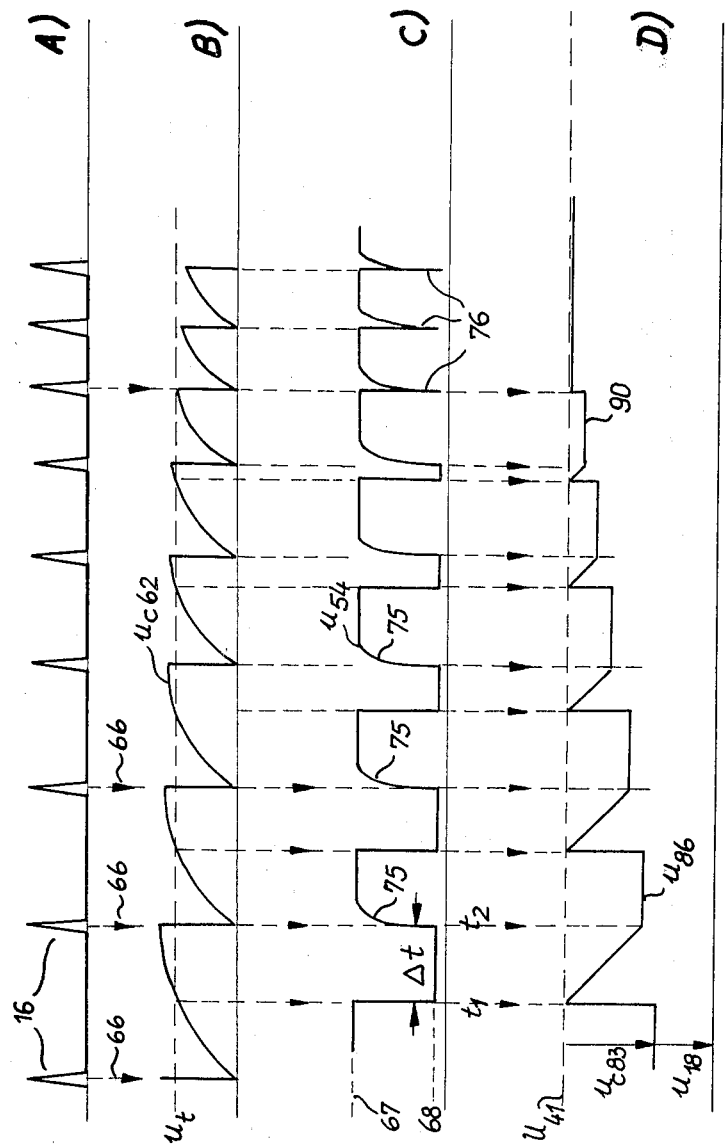
FIG. 2 is a graphical presentation of wave forms and the like on a common time scale for explanation of the circuit of FIG. 1.

Their generation by the setback transistor 71 which operates on the input of the operational amplifier 51 has been found particularly advantageous because by virtue of the first capacitor 62, a very favorable small time delay is produced that is here used in a very effective way and also because the setback transistor 71 does not affect the shape of the output signal at the output 54 (see line (C) of FIG. 2) when the speed is too small.

The further processing of the signal coming from the output 54 will now be described. The cathode of a diode 80 is connected to the output 54 and has its anode connected through a resistor 81 with the collector of a pnp transistor 82 and to one electrode of a second capacitor 83 which is also connected through a resistor 84 with the output line 18 and with another resistor 85 that connects back to the anode of the diode 80. The other electrode of the second capacitor 83 which may, for example, have a value of 10 nF, and the emitter of the transistor 82 are connected with the positive voltage bus 41. The transistor 82 serves as the charge normalizing member for the capacitor 83. This means that when this transistor is conducting, it normalizes the charge of this capacitor at the value zero. The base of the transistor 82 is connected via a resistor 83' with the positive voltage bus 41 and via a capacitor 84' with the output 54 of the operational amplifier 51, which output is also connected through the resistor 85' with the positive voltage bus 41.

When the output 54 of the operational amplifier 51 jumps at the moment t1 from the potential 67 to the more negative potential 68, as shown with reference to line (C) of FIG. 2, the transistor 82 is turned on through the capacitor 84', and while briefly conducting, it discharges the second capacitor 83.

Line (D) of FIG. 2 shows the potential $u_{86}$ at the (lower) electrode 86 of the second capacitor 83. Upon discharge, this potential jumps to the potential of positive bus 41 which is designated $U_{41}$ with reference to line (D) of FIG. 2. The charge voltage of the capacitor 83 is designated $u_{C83}$ with reference to line (D) of FIG. 2. The voltage between the output line 18 and the negative voltage bus 38 is there designated $u_{18}$. As can be seen from this portion of FIG. 2, $u_{18}$ and $u_{C83}$ when added, form a value that corresponds to the output voltage of the voltage regulator 39, thus, for example, five volts. The voltage $u_{18}$ is then used for further processing in the regulating amplifier or "controller" 19.

After the discharge at the moment $t_1$, the second capacitor 83 is charged through the diode 80 and the resistor 81 for a period extending through moment $t_2$, at which time the potential at the output 54 of the operational amplifier 51 again jumps to a positive value. The value of the voltage $u_{C83}$, which the second capacitor 83 reaches, is thus a direct measure for the spacing and time between the moments $t_1$ and $t_2$, and this measure is designated $\Delta t$ in FIG. 2C. The value $\Delta t$ is large at low speed and accordingly $u_{C83}$ is then large and $u_{18}$ is small. With increasing speed, $\Delta t$ become smaller and smaller, so that $u_{C83}$ likewise becomes ever smaller and $u_{18}$ becomes ever greater, until the maximum value of $u_{18}$, namely, $u_{41}$, is reached.

Figure 5:
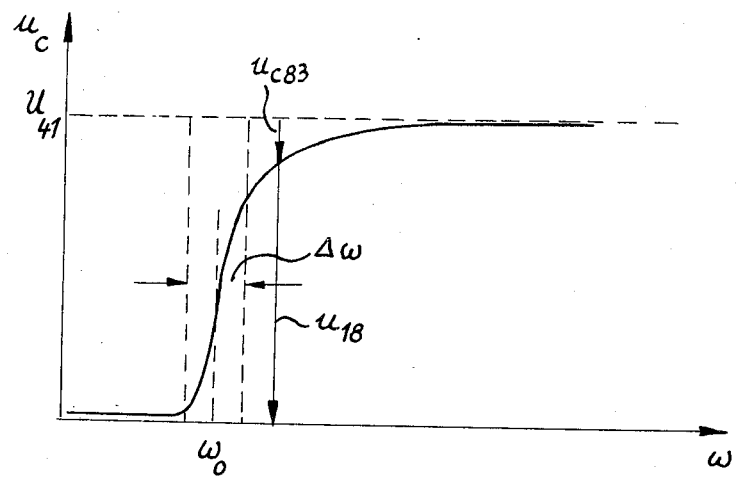
FIG. 5 is a graph for further explanation of the manner of operation of the circuit of FIG. 1.

FIG. 5 shows this dependence on the frequency graphically: with increasing frequency, the value of $u_{18}$ rises monotonically from about zero to $U_{41}$ in a very small frequency region of a few hertz, typically 1/50 to 1/200 of the frequency at which the speed is regulated. If the desired speed is exceeded, because the motor has very suddenly speeded up, the negative needle pulses 76 (line (C) of FIG. 2) of the output 54 of the operational amplifier 51 cause the second capacitor 83 to be newly discharged through the charge normalizing component 82 at every needle pulse (i.e., no false value can remain stored in this capacitor ). If these needle pulses 76 were not produced, the value of voltage across the capacitor 83 designaed 90 with reference to line (D) of FIG. 2, would remain stored and would falsely simulate a speed that is too low. This is this thus prevented by the needle pulses 76 in a highly reliable manner and with a minimum of components and expense.

The signal $u_{18}$ is supplied to the controller 19 which contains an operational amplifier 92 of which the output 93 is connected to a P-I feedback branch (series connection of the resistor 94 and the capacitor 95) to the inverting input 96 of the operational amplifier. A capacitor 97 is provided in parallel with P-I feedback network 94,95 for filtering. The noninverting input 98 is connected via a resistor 99 with the tap of a voltage divider composed of two resistors 101 and 102 of about the same value connected between the positive and negative busses 41 and 38.

Two diodes 103 are provided between the inputs 96 and 98 in anti-parallel connection and thereby limit the output signal of the controller 19 and thus also the current in the motor 12.

As can be seen from FIG. 5, at the desired speed the voltage $u_{18}$ lies at about half the value of $U_{41}$ (i.e., the two inputs of the operational amplifier 92 then have about the same potential). Above the desired speed $u_{18}$ is so high that the operational amplifier blocks and the motor 12 receives no current. For a speed that is too low, $u_{18}$ is too small, the signal at the output 20 becomes large and the current in the motor 12 is regulated at the maximum permissible value.

The current regulator 21 which is operated by the output of the controller 19 contains an operational amplifier 105 that controls a power transistor 106 in the current circuit of the motor 12. A measuring resistance 107 (0.1 ohm) serves to measure the current by producing a voltage which is supplied via a resistor 108 to the noninverting input 109 of the amplifier 105, which is connected through a resistor 110 to the tap 111 of a potentiometer 112 that is fed with the output voltage of the voltage regulator 39 and serves to fit or match the current regulator 21 to the preceeding controller 19. The output 93 of the operational amplifier 92 is connected through a resistor 113 with the inverting input of the operational amplifier 105, where a resistor 114 is also connected leading to the negative voltage bus 38.

Thus when the controller 19 provides a large signal, the current in the motor 12 is regulated at a high value. If the speed increases, the current in the motor diminishes. When the speed rises above the desired value, the current in the motor 12 is brought down effectively to zero, thanks to the safety feature provided by the setback transistor 71, so that a run-up to excessively high speeds is safely avoided.

Figure 3:
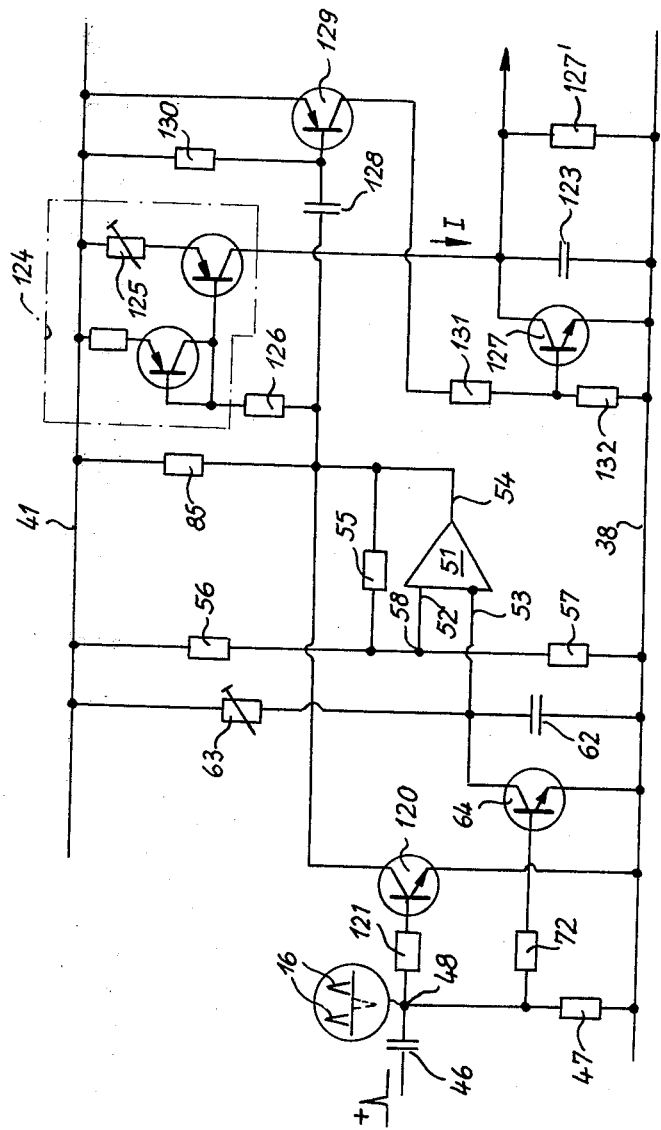
FIG. 3 is a circuit diagram of a second embodiment of the invention.
Figure 4:
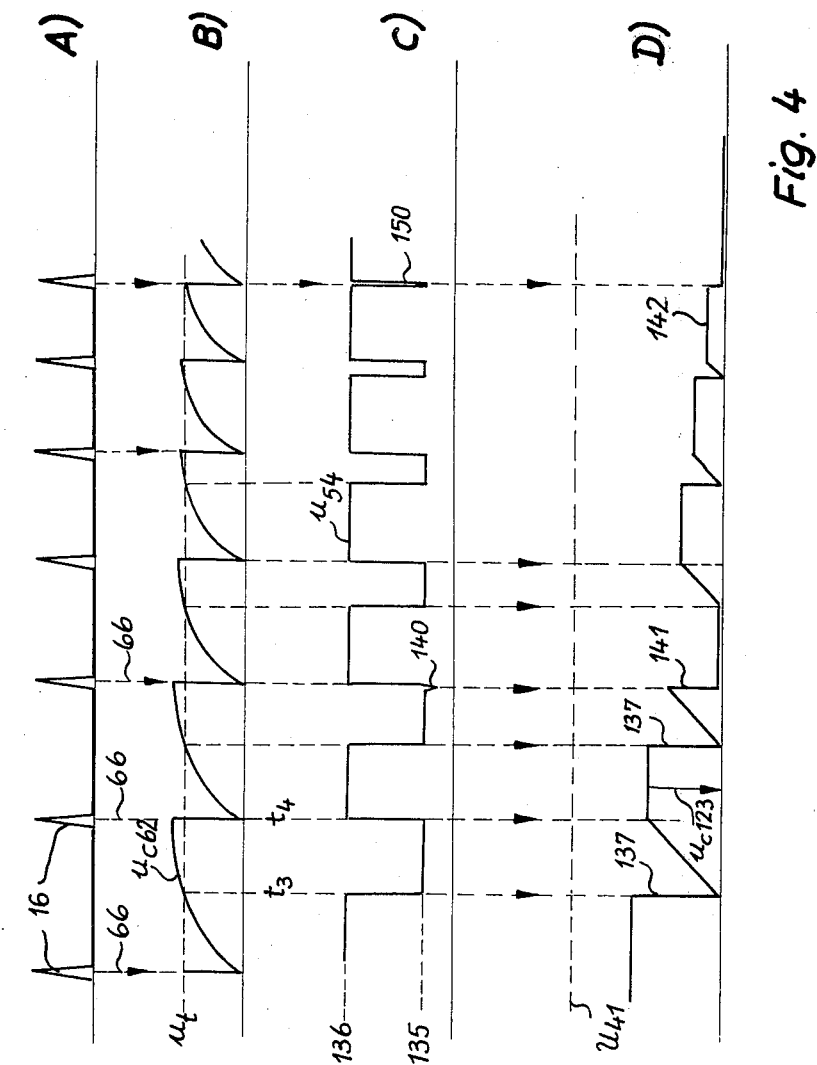
FIG. 4 is a graphical presentation of wave forms on a common time scale for explanation of the circuit of FIG. 3.

FIGS. 3 and 4 refer to a second embodiment of the invention. The portion shown in FIG. 3 corresponds to the frequency-to-voltage converter 17 of FIG. 1. The other portions are not shown again here because these are unchanged. Parts that are the same or operate in the same way as those as FIG. 1 are designated with the same reference numerals as there and generally not further described.

The first capacitor 62, its charging resistor 63, its discharge component 64 and the differentating network 46, 57 are the same as in FIG. 1. The tap 58 of the voltage divider 56, 57 is in this case connected directly to the noninverting inputs 52 of the operational amplifier.

An npn setback transistor 120 is here connected through a resistor 121 to the circuit point 48 so that with every positive needle pulse 16 it becomes conductive. Its collector is connected to the output 54 of the operational amplifier and its emitter to the negative bus 38, so that it, when it conducts, puts the output 54 of the operational amplifier substantially at the potential of the negative bus 38.

The second capacitor 123 here has one of its electrodes connected to the negative bus 38 and is charged through a constant current circuit 124 at a current I derived from the positive voltage bus 41 so long as the output 54 of the operational amplifier has a low potential. An adjustable resistor 125 serves for adjustment of this constant current. Turning on the constant current is performed through a resistor 126 connected to the output 54 of the operational amplifier.

A charge normalizing member in the form of an npn transistor 127 is provided in order to discharge the second capacitor 123 every time when the potential at the output 54 of the operational amplifier jumps to a lower value. For this purpose, the output 54 is connected via a capacitor 128 with the base of a pnp transistor 129 that is connected through a resistor 130 with the positive voltage bus 41, to which the emitter of the transistor 129 is also connected. The collector of that transistor is connected through a resistor 131 with the base of the transistor 127, which on its part is connected through a resistor 132 with the negative voltage bus 38.

FIG. 4 is referred to for explanation of the circuit of FIG. 3. The lines (A) and (B) correspond with the lines (A) and (B) of FIG. 2 so that reference to the latter can be made. When the voltage of the first capacitor 62 oversteps the value $u_t$, the output 54 becomes suddenly more negative and takes a potential 135 as illustrated at $t_3$ in line (C) of FIG. 4.

When the first capacitor 62 is then discharged (moment $t_4$) via the transistor 64, the output signal at the output 54 becomes positive again and takes a potential 136.

The potential jump at the moment $t_3$ makes the transistor 129 and through it also the transistor 127 conducting for a brief period and discharges the second capacitor 129, as shown at 137 in line (D) of FIG. 4. Thereupon, the second capacitor 123 is charged through the constant current circuit 124 with the constant current I until the moment $t_4$. At the moment $t_4$, the constant current circuit 124 shuts off because the potential at the output 54 of the operational amplifier again takes the value 136, and the capacitor 123 holds the voltage $u_{C123}$ thus reached until this capacitor is again discharged as shown at 137 with reference to line (D) of FIG. 4.

The circuit of FIG. 3 in itself operates very well, but as the result of different signal transit times a so-called glitch can be produced that disturbs the regulation. Thus, as explained, the transistor 120 is briefly turned on by the pulses 16 and thereby lowers the potential at the output 54. When this event occurs at the same time as the trailing edge of the signal $u_{54}$ (see line (C) of FIG. 4) there is no disturbance, but if this event occurs shortly before or shortly thereafter, it can make trouble. Line (C) of FIG. 4 shows at 140 such an undesired supplemental pulse that is produced by the transistor 120 being turned on. This pulse 140 has the effect, through the capacitor 128, that the transistors 129 and 127 become briefly conducting and provide an untimely discharge of the second capacitor 123, as shown at 141 with reference to line (D) of FIG. 4. This misleads the control circuit by simulating an excessively high speedp i.e., a false regulation process results. Such disturbing pulses in practice do not appear in circuits that are built up of discrete components, but they can appear in the case of integrated circuits. In other words, the circuit of FIG. 1 is more suitable for use in or with more integrated circuits.

As can be observed with reference to line (D) of FIG. 4, the average voltage $u_{C123}$ of the second capacitor 123 sinks with increasing motor speed. For this reason the connections 96 and 98 must be interchanged at the controller 19 (FIG. 1) in order to obtain its correct controller characteristics when using the circuit of FIG. 3. In other respects the controller 19 and the current regulator 21 can be constituted in the same manner as in FIG. 1.

When the desired speed is exceeded, the voltage at the first capacitor 62 remains constantly below the value $u_t$ and the operational amplifier 51 does therefore not alter its output signal any more, which means that the last stored value at the second capacitor 123 (142 in FIG. 4) is continuously maintained. However, since the transistor 120 is briefly conducting at the occurence of each needle pulse 16, brief negative needle pulses 150 are produced at the output 54 in this case also, which activate the transistor 127 and discharge the second capacitor 123. The charge value stored in the second capacitor 123 then remains at zero until the motor speed again falls below the desired value. Here also, no false value can remain stored in the second capacitor 123, and the voltage value of this capacitor is continuously updated.

Figure 6:
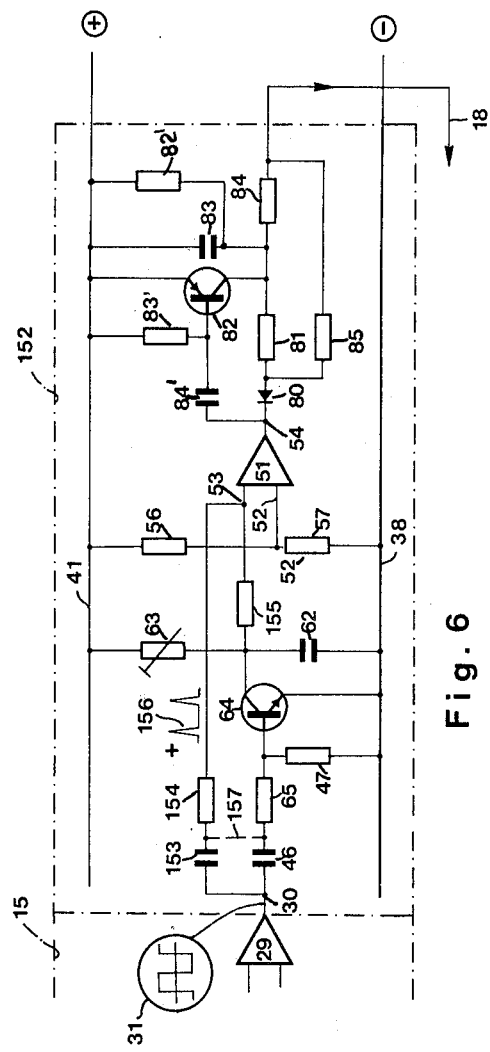
FIG. 6 is a circuit diagram of a third embodiment of the invention.

FIG. 6 shows a third embodiment of the invention in the form of a variant of FIG. 1. The same or identically operating parts as in FIG. 1 are given the same reference numerals in FIG. 6 and in general are not now further described. This variant concerns only the frequency to voltage converter 17 of FIG. 1. The other portions of the circuit are identical with FIG. 1. The modified frequency-to-voltage converter is designated 152 in FIG. 6. The transistor 71 of FIG. 1 and its associated components are completely dispensed with in FIG. 6. The circuit of the discharge transistor 64 is substantially like that in FIG. 1. The resistor 47 lies directly between the base and emitter of the transistor 64. Between the output 30 of the operational amplifier 29 and the base of the transistor 64 is located a series-connected combination of the capacitor 46 and the resistor 65. The capacitor 46 and the resistors 65 and 47 function as a differentiating network as in FIG. 1, so that the transistor 64 is briefly made conducting by the positive flank of each of the signals 31, discharging the first capacitor 62 as has been described in detail with reference to FIG. 1. Here also, the operational amplifier 51 operates as a comparator (i.e., the potential of its output 54 becomes suddenly more negative when the potential at its input 53 exceeds that at its input 52, as has also been described fully with reference to FIG. 1) so that then—in a negative potential jump—the capacitor 83 is discharged through the transistor 82, after which the capacitor 83 is charged through the resistor 81 and the diode 80 so long as the output 54 remains negative so that its charge is a measure for the actual speed. This charge voltage at the second capacitor 83 is then supplied to the controller 19 over the line 18 in the manner described in detail with reference to FIG. 1. When the speed becomes too high, the potential of the output 54 would remain continously positive because the first capacitor 62 no longer reacher the necessary voltage. A charge stored at the second capacitor 83 could then be held steady and the circuit would then continuously be misled by what appear to be too low a speed as has already been explained in connection with FIGS. 1 and 2 (see reference numeral 90).

In order to avoid this difficulty, a second differentating network is connected in this case to the output 30, for this purpose between this output and the inverting input 53 a series combination of a small capacitor 153 (e.g., 22 pF) and a resistor 154 (e.g., 2.2 k ohms).

Furthermore, a relatively high-resistance resistor 155 (e.g., 47 k ohms) is provided for decoupling (compare the resistor 59 of FIG. 1) between the inverting input 53 of the operational amplifier and the collector of the transistor 64.

If now the potential at the output 30 of the operational amplifier 29 jumps to a more positive value, the transistor 64 is turned on and discharges the first capacitor 62, an operation that lasts for a certain time. At the same time the differentiating network consisting of the capacitor 153 and the resistor 154 supplies a brief positive needle pulse 156 to the inverting input 53 of the operational amplifier 52, as the result of which a negative needle pulse appears quite briefly at the output 54 of the comparator 51.

This negative needle pulse briefly turns on the pnp transistor 82 and thereby produces a discharge of the second capacitor 83, in this case also, which is to say when the speed is too high, so that the controller 19 is not misled by an apparently low speed, but instead the capacitor 83 actually takes on a voltage that corresponds to an excessively high speed. On the other hand, this negative needle pulse is so short that the capacitor 83 cannot charge up over the resistor 81 within the short duration of the pulse.

The relatively large resistance 155 prevents the positive needle pulses 156 from being short-circuited through the first capacitor 62 and thus decouples the signal sources from each other.

In the variant circuit illustrated in FIG. 6, the differentiated needle pulses 156 are not amplified but are supplied directly to the input 53. In this manner the pulses have a minimum transit time, and no disturbing effects can arise such as were described in connection with FIGS. 3 and 4 with reference to the designations 140 and 141 because in that case, relatively long lifetimes for these pulses were involved. The modification illustrated in FIG. 6 is hence unusually simple and, furthermore—on account of the extreme small signal transit times—most reliable and certain in operation.

If necessary, the capacitor 153 can be omitted in the variant circuit of FIG. 6 and instead the resistor 154 can be connected between the capacitor 46 and the resistor 65, as is indicated by the broken line 157. One capacitor is saved thereby, which can be of advantage in the case of an integrated circuit. The capacitor 46 (e.g., 220 pF) is then common to the two differentiating networks.

Although the invention has been described with reference to particular illustrative examples, it will be understood that further variations and modifications are possible within the inventive concept.

We claim:

1. Speed control apparatus for a rotary machine comprising signal generating means for producing a signal of a frequency proportional to rotary speed and having also torque varying means for adjusting the rotary speed of the machine:

(a) a first capacitor (62), a charging circuit (63) and a discharging circuit (64) therefor, said discharging circuit being constituted so as to discharge said first capacitor in a short period of time periodically in response to signals (16) derived from the signal (14) produced by said signal generating means;

(b) a threshold circuit (51) to which said first capacitor is connected for providing an output signal when the voltage across said first capacitor exceeds a predetermined value;

(c) a second capacitor (83,123) connected so that its charge condition is controlled by said output signal of said threshold circuit;

(d) means (19,20) responsive to the voltage across said second capacitor for actuating said torque varying means of said rotary machine;

(e) active normalizing circuit means (82;127) connected to said second capacitor; and (f) means (71; 120; 153-155) for activating said active normalizing circuit means before each new changes of the charge condition of said second capacitor produced by said threshold circuit output signal and thereby bringing the charge condition of said second capacitor substantially to a predetermined charge value before the beginning of each new charging of said second capacitor by said threshold circuit output signal.

2. Speed control apparatus as defined in claim 1, in which said predetermined charge value of said second capacitor is substantially zero charge value.

3. Speed control apparatus as defined in claim 1, in which a differentiating network (83'; 84'; 128, 130) is interposed between the output of said threshold circuit and said active normalizing circuit means (82; 127), connected for activating the latter promptly upon the appearance of an output signal of said threshold circuit responsive to a rise of the voltage of said first capacitor past said predetermined voltage or of a signal substantially equivalent to the onset of output signals responsive to said rise of voltage of said first capacitor.

4. Speed control apparatus as defined in claim 3, in which said threshold circuit (54) is constituted as a comparator having at one input thereof (52 or 53) a connection for receiving a control pulse simultaneously with the activation of said discharging circuit (64) of said first capacitor (62) whereby there is produced briefly at the output of said comparator a signal substantially equivalent to the onset of an output signal of said comparator which is responsive to a rise of voltage of said capacitor past said predetermined voltage.

5. Speed control apparatus as defined in claim 4, in which a second differentating network (153,154) is connected to an input (53) of said comparator threshold circuit (51) for providing thereto a brief sharp pulse synchronously with the onset of discharging of said first capacitor through its discharging circuit.

6. Speed control apparatus as defined in claim 4, in which amplifying means (71) are provided having the output thereof connected to an input (52) of said comparator threshold circuit (51) for furnishing the brief activating pulse thereto in the correct sense of producing a corresponding brief output pulse, said amplifying means having its input connected so as to provide said pulse at its output synchronously with the onset of discharging of said first capacitor (62) through its discharging circuit (64).

7. Speed control apparatus as defined in claim 5 or claim 6 in which a relatively high resistance (59; 155) is connected between said input of said comparator threshold circuit (51) to which a brief pulse is applied synchronously with the onset of discharging of said first capacitor, so as to decouple the application of said pulse to said input from another signal applied to said input.

8. Speed control apparatus as defined in claim 1, 2 or 3 in which electronic switching means (120) are provided responsive to the same signals (16) to which said discharging circuit (64) of said first capacitor is responsive and are connected for producing, at the output (54) of said threshold circuit (51), a signal (150) substantially equivalent to the onset of an output signal of said threshold circuit responsive to the rise of the voltage across said first capacitor past said predetermined value of voltage thereof.

9. Speed control apparatus according to claim 1 wherein said active normalizing circuit means have at least one parallel passive circuit means.

10. Speed control apparatus according to claim 9, said passive circuit means is a resistor.

* * * * *